United States Patent
Saroor et al.

(10) Patent No.: US 11,288,365 B2
(45) Date of Patent: Mar. 29, 2022

(54) INTRUSION DETECTIONS WITH AMBIENT LIGHT SENSORS AND SUPER INPUT/OUTPUT CIRCUITS

(71) Applicant: Hewlett-Packard Development Company, L.P., Spring, TX (US)

(72) Inventors: Shaheen Saroor, Spring, TX (US); Nam H Nguyen, Spring, TX (US); Ted T Nguy, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 237 days.

(21) Appl. No.: 16/475,998

(22) PCT Filed: Feb. 2, 2017

(86) PCT No.: PCT/US2017/016021
§ 371 (c)(1),
(2) Date: Jul. 3, 2019

(87) PCT Pub. No.: WO2018/143981
PCT Pub. Date: Aug. 9, 2018

(65) Prior Publication Data
US 2019/0347411 A1    Nov. 14, 2019

(51) Int. Cl.
| G06F 21/00 | (2013.01) |
| G06F 21/55 | (2013.01) |
| G06F 21/73 | (2013.01) |
| G06F 21/88 | (2013.01) |
| G06F 21/86 | (2013.01) |
| G08B 13/08 | (2006.01) |
| G08B 13/189 | (2006.01) |

(52) U.S. Cl.
CPC ........... G06F 21/554 (2013.01); G06F 21/73 (2013.01); G06F 21/88 (2013.01); *G06F 21/86* (2013.01); *G08B 13/08* (2013.01); *G08B 13/1895* (2013.01)

(58) Field of Classification Search
None
See application file for complete search history.

(56) References Cited

U.S. PATENT DOCUMENTS

| 5,912,621 A | 6/1999 | Schmidt |
| 6,388,574 B1 * | 5/2002 | Davis ................. G08B 13/1481 340/568.1 |

(Continued)

FOREIGN PATENT DOCUMENTS

| CA | 2313652 A1 | 1/2001 |
| EP | 0892334 B1 | 2/2003 |

(Continued)

OTHER PUBLICATIONS

Texas Instruments, "OPT3001-Q1 Ambient Light Sensor (ALS)", Texas Instruments Incorporated, 2018, p. 1-44. (Year: 2018).*

(Continued)

*Primary Examiner* — Jeffery L Williams
(74) *Attorney, Agent, or Firm* — Fabian VanCott

(57) ABSTRACT

An example intrusion detection system for a computer includes: an ambient light sensor to detect an increase in ambient light indicative of a housing of the computer being opened; and a super input/output integrated circuit (SIO) to receive a signal from the ambient light sensor indicating that the housing of the computer has been opened.

18 Claims, 8 Drawing Sheets

(56) References Cited

U.S. PATENT DOCUMENTS

| | | | |
|---|---|---|---|
| 6,457,137 B1 | 9/2002 | Mitchell et al. | |
| 7,518,507 B2 | 4/2009 | Dalzell et al. | |
| 9,453,881 B2 | 9/2016 | Yoshimura et al. | |
| 10,061,599 B1* | 8/2018 | Yakovlev | G06F 9/44505 |
| 2001/0047483 A1* | 11/2001 | Kuo | G06F 21/55 |
| | | | 726/26 |
| 2006/0005264 A1* | 1/2006 | Lin | G06F 1/263 |
| | | | 726/35 |
| 2014/0201514 A1* | 7/2014 | Chao | G06F 9/4418 |
| | | | 713/2 |
| 2014/0321700 A1 | 10/2014 | Zhan | |
| 2015/0037781 A1 | 2/2015 | Breed et al. | |
| 2015/0205746 A1* | 7/2015 | Bailey | G06F 13/385 |
| | | | 710/315 |
| 2016/0001514 A1 | 1/2016 | Lange et al. | |
| 2016/0028404 A1 | 1/2016 | Berke et al. | |
| 2016/0378603 A1* | 12/2016 | Herzi | G06F 11/1417 |
| | | | 714/6.12 |
| 2016/0378604 A1* | 12/2016 | Teshome | G06F 9/4406 |
| | | | 714/36 |
| 2016/0378605 A1* | 12/2016 | Teshome | G06F 11/3062 |
| | | | 714/36 |
| 2020/0143058 A1* | 5/2020 | Ali | G06F 21/572 |

FOREIGN PATENT DOCUMENTS

| | | |
|---|---|---|
| EP | 2056178 A1 | 5/2009 |
| WO | WO-2015196450 A1 | 12/2015 |

OTHER PUBLICATIONS

Digital Proximity Sensor with Ambient Light Sensor and Interrupt, Feb. 2013, <http://www.onsemi.com/pub_link/Collateral/NOA3301-D.PDF>.

* cited by examiner

INTRUSION DETECTIONS WITH AMBIENT LIGHT SENSORS AND SUPER INPUT/OUTPUT CIRCUITS

BACKGROUND

In commercial and other settings, computers and computer systems may be subject to tampering. For example, a desktop computer, server or other computer system might be opened illicitly so that a valuable internal component may be removed entirely or replaced by a lesser component. This may be most likely to occur when the computer in question is not being used or is turned off in the hope that the illicit access will go undetected for some period of time.

BRIEF DESCRIPTION OF THE DRAWINGS

The accompanying drawings illustrate various implementations of the principles described herein and are a part of the specification. The illustrated implementations are merely examples and do not limit the scope of the claims.

Throughout the drawings, identical reference numbers designate similar, but not necessarily identical, elements.

DETAILED DESCRIPTION

As noted above, in various settings, computers and computer systems may be subject to tampering. For example, a desktop computer, server or other computer system might be opened illicitly so that a valuable internal component may be removed entirely or replaced by a lesser component. This may be most likely to occur when the computer in question is not being used or is turned off in the hope that the illicit access will go undetected for some period of time.

Consequently, the present specification describes, for example, an intrusion detection system for a computer that includes: an ambient light sensor to detect an increase in ambient light indicative of a housing of the computer being opened; and a super input/output integrated circuit (SIO) to receive a signal from the ambient light sensor indicating that the housing of the computer has been opened.

In another example, an intrusion detection system for a computer includes: an ambient light sensor to detect an increase in ambient light indicative of a housing of the computer being opened; a super input/output (I/O) integrated circuit to receive a signal from the ambient light sensor indicating that the housing of the computer has been opened, where the SIO stores identification data for some of the components of the computer; and a Basic Input Output System (BIOS) to communicate with the SIO when the computer is booted to determine whether the housing of the computer has been opened, the BIOS further to verify the presence of the components of the computer using the identification data stored in the SIO, in response to an indication that the housing of the computer was opened prior to the computer being booted.

In another example, the present specification describes a method for intrusion detection in a computer by: detecting opening of a housing of the computer with an ambient light sensor internal to the housing; and, in response to detection of an opening of the housing, electronically conducting an inventory of components of the computer internal to the housing using identification data stored in the computer that is associated with the components.

As used herein and in the following claims, the term "super input/output integrated circuit" (SIO) refers to an integrated circuit, usually on a computer motherboard, that handles the slower and less prominent input/output devices of a computer system such as a keyboard and mouse, parallel and serial ports and the real-time clock.

As used herein and in the following claims, the term "Basic Input/Output System" (BIOS) refers to firmware and associated processing resources used to perform hardware initialization during the booting process when a computer is powered upon startup.

As used herein and in the following claims, the term "Inter-Integrated Circuit" (I2C) refers to a serial computer bus used for attaching lower-speed peripheral ICs to processors and microcontrollers in short-distance, intra-board communication.

Figure 1:
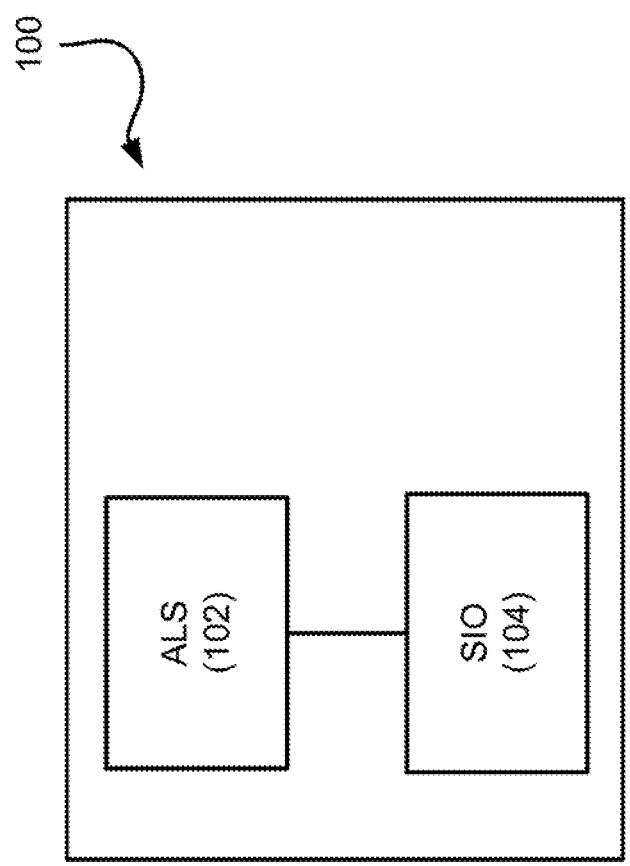
FIG. 1 is a block diagram of an example intrusion detection system consistent with disclosed Implementations.

FIG. 1 is a block diagram of an example intrusion detection system consistent with disclosed implementations. As shown in FIG. 1, the intrusion detection system 100 includes an ambient light sensor 102 that is in communication with a super input/output integrated circuit (SIO).

The ambient light sensor 102 measures the level of ambient light. If the ambient light sensor 102 is disposed internal to a computer housing, the light reaching the sensor may be very limited. However, if the housing of the computer is opened, there will typically be a significant increase in the level of ambient light. This will be true even in a dark room if the person opening the computer housing is using a flashlight or other light source in order to see to open the housing.

By detecting any such increase in the level of ambient light, the ambient light sensor 102 can indicate when the computer housing has been opened. Consequently, the ambient light sensor 102 provides intrusion detection.

The ambient light sensor 102 may be an integrated circuit such as a single chip lux meter, measuring the intensity of light as visible to the human eye. Such devices can have a precise spectral response and strong infra-red (IR) rejection, which helps the sensor accurately meter the intensity of light as seen by the human eye regardless of the light source. It is presumed that, in the event of an intrusion into the housing, the intruder will be using some light visible to the human eye in order to work.

The strong IR rejection also helps maintain high accuracy when the sensor is mounted, for example, under dark glass for aesthetics. The ambient light sensor 102 may have a measurement capability ranging from 0.01 lux up to 83 k lux without manually selecting full-scale ranges by using a built-in, full-scale setting feature.

Additionally, the ambient light sensor may have very low power consumption (e.g., 1.8 µA) and a low power-supply voltage (e.g., 1.6 to 3.6V). This low power requirement and a small size (e.g., 2 mm×2 mm) suits the ambient light sensor well for use in an efficient and inexpensive intrusion detection system.

As shown in FIG. 1, when the ambient light sensor 102 detects an intrusion event indicated by an increase the ambient light level, the ambient light sensor 102 will signal the SIO 104. As will be described in further detail below, the SIO 104 will have power even if the computer system is generally in a powered down or turned-off state. Consequently, the SIO 104 can record intrusion events detected by the ambient light sensor 102 even when the computer or computer system being monitored is powered down.

Figure 2:
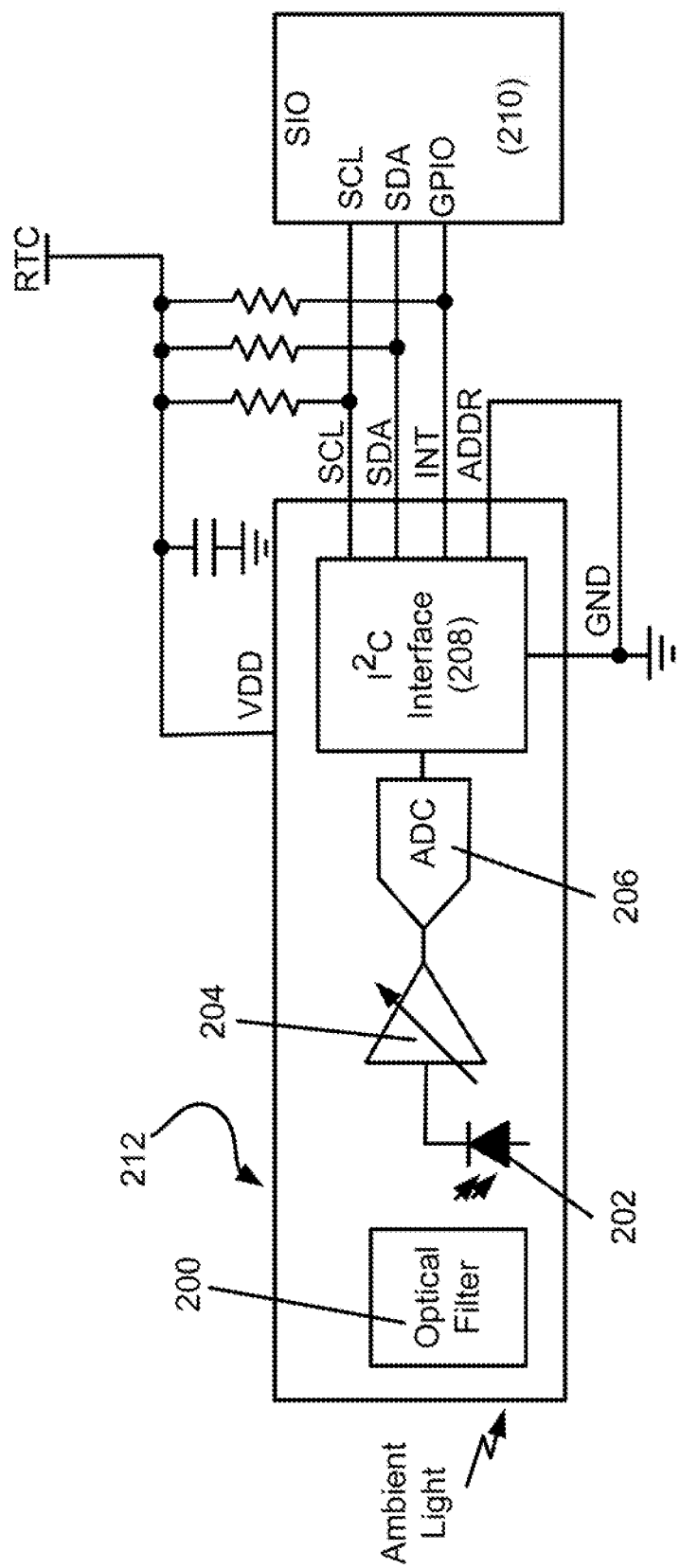
FIG. 2 is another block diagram of an example intrusion detection system consistent with disclosed implementations.

FIG. 2 is another block diagram of an example intrusion detection system consistent with disclosed implementations. As shown in FIG. 2, an ambient light sensor 212 may include a photodiode 202 that receives ambient light through an optical filter 200. The optical filter 200 may be tuned, as described above, to admit light specifically within the range of human vision.

The photodiode 202 will output an electrical signal indicative of the level of ambient light received, as discussed above. This signal is provided to an amplifier 204 and analog-to-digital convertor 206.

The ambient light sensor 212 is connected to the SIO 210 by an I2C bus. Consequently, the ambient light sensor 212 includes an I2C interface 208 to the bus connecting to the SIO 210. The I2C bus includes a clock line (SCL), a data line (SDA), and an interrupt (INT) line. The INT line connects to a General Purpose Input/Output (GPIO) input of the SIO. The address line (ADDR) of the I2C interface may be connected to ground (GND) as shown in FIG. 2.

Measurements from the ambient light sensor 212 can be either continuous or single-shot. The control and interrupt system of the I2C interface 208 with the SIO 210 features autonomous operation, allowing the main processor of the computer or system being monitored to sleep or be powered down while the sensor 212 searches for appropriate wake-up events to report via the interrupt pin (INT). The digital output from the ADC 206 is reported over the I2C compatible, two-wire serial interface of the SCL and SDA lines.

Any time the computer housing is opened, for example, by having a cover removed, the ambient light sensor 212 detects this condition via exposure to ambient light and asserts the interrupt signal (INT) to the SIO 210. With the clock and data lines (SCL, SDA), the SIO 210 can determine different events signaled by the ambient light sensor 212. Consequently, the SIO 210 can detect and count multiple intrusion events that may occur during a period of time the computer being monitored is powered down.

As shown in FIG. 2, the ambient light sensor 212 draws power (VDD) from a Real Time Clock power rail (RTC) which is active even when the computer monitored is generally powered down. For example, the RTC may derive its power from a coin battery of the system.

Figure 3:
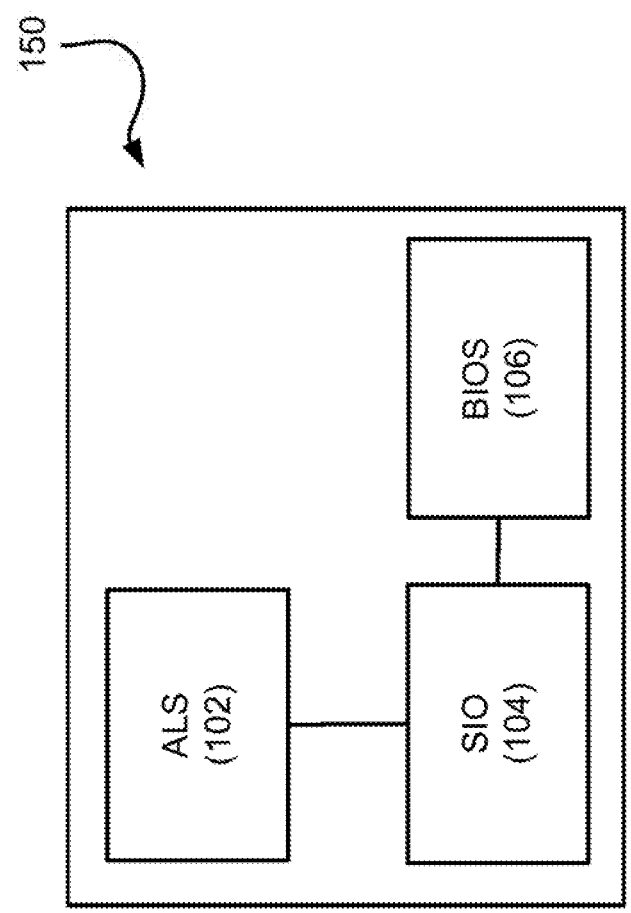
FIG. 3 is another block diagram of an example intrusion detection system consistent with disclosed implementations.

FIG. 3 is another block diagram of an example intrusion detection system consistent with disclosed implementations. As shown in FIG. 3, the instruction detection system 150 includes an ambient light sensor 102 and SIO 104 as described above.

As also shown in FIG. 3, the system includes the BIOS 106 of the computer being monitored. The function of the BIOS is to initialize the computer system components upon startup until the operating system is launched and takes control of the machine.

In this example, the BIOS 106 is configured to, upon startup for example, query the SIO 104 to determine whether there were any intrusion events detected since the computer was last started. As noted above, the SIO 104 can inform the BIOS 106 whether any intrusion was detected and, if there were multiple intrusions, the number and timing of the intrusions. The BIOS 106 can then report this information to a user, as will be described in further detail below.

Thus, FIG. 3 shows an intrusion detection system 150 for a computer that includes: an ambient light sensor 102 to detect an increase in ambient light indicative of a housing of the computer being opened; a super input/output (I/O) integrated circuit 104 to receive a signal from the ambient light sensor indicating that the housing of the computer has been opened, where the SIO stores identification data for some of the components of the computer; and a Basic Input Output System (BIOS) 106 to communicate with the SIO when the computer is booted to determine whether the housing of the computer has been opened and to verify the presence of the components of the computer using the identification data stored in the SIO, in response to an indication that the housing of the computer was opened prior to the computer being booted.

Figure 4:
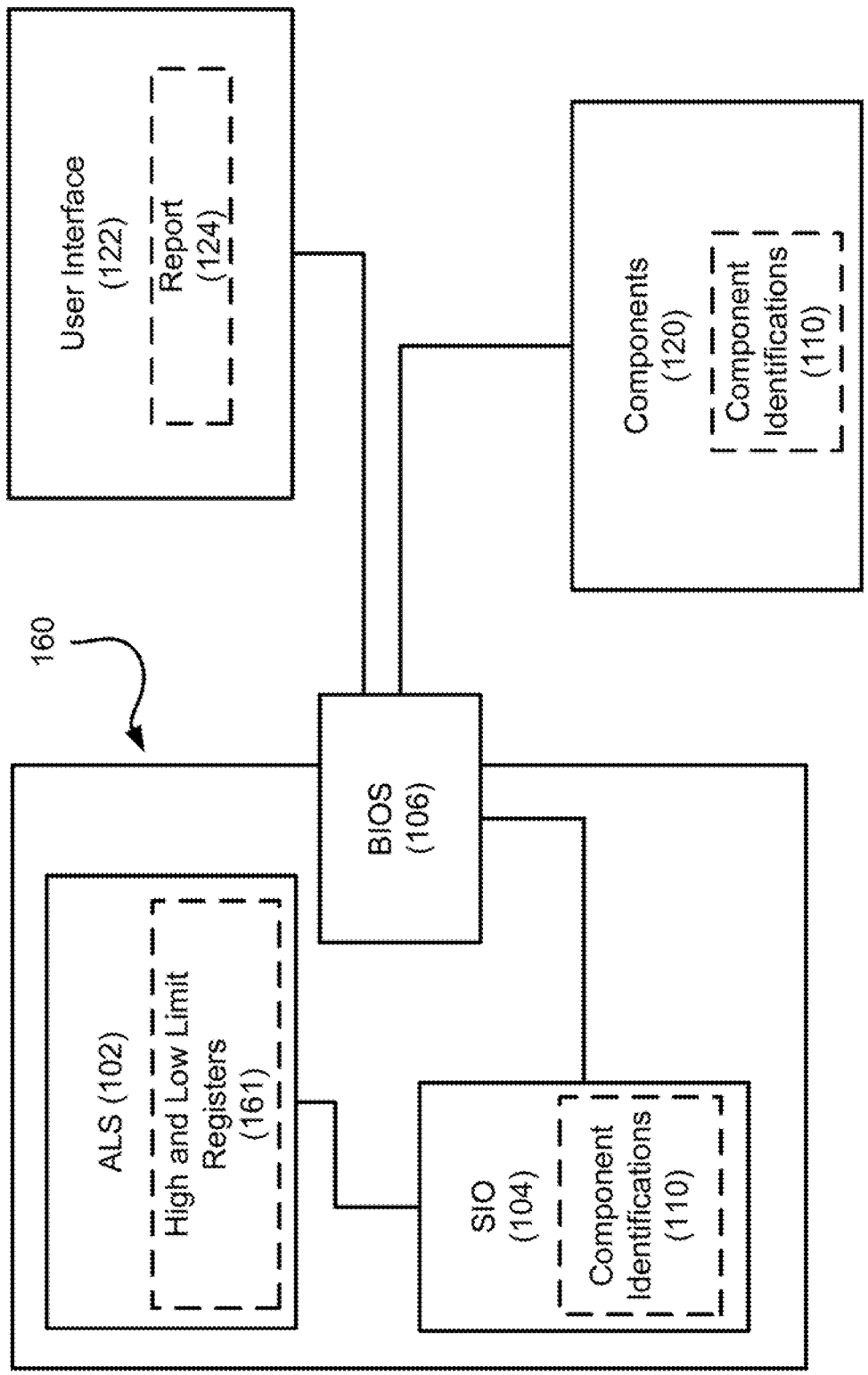
FIG. 4 is a block diagram of an example intrusion detection system within a monitored computer consistent with disclosed implementations.

FIG. 4 is a block diagram of an example intrusion detection system within a monitored computer consistent with disclosed implementations. As shown in FIG. 4, the instruction detection system 160 includes an ambient light sensor 102 and SIO 104 as described above.

The ambient light sensor 102 may include high-limit and low-limit registers 161 to provide control over what detected light levels are considered to indicate an intrusion event as opposed to, for example, a device malfunction or other source of an erroneous signal.

As described above, when an intrusion event occurs, the ambient light sensor 102 asserts the interrupt to the SIO 104. The interrupt event conditions are controlled by the high-limit and low-limit registers 161, as well as by a configuration register latch and fault count fields. The results of comparing the result register with the high-limit register and low-limit register are referred to as fault events. While such an event may occur when the monitored computer is powered down, upon power up the SIO 104 will be able to read the status of the interrupt which is latched into the ambient light sensor device register to determine that an intrusion event has occurred.

In this example, the SIO 104 stores component identifications 110 for some components of the computer system being monitored. These components may include the components that are likely to be stolen or illicitly swapped out of the computer or computer system during an unauthorized intrusion. Examples include a processor, memory module, storage (both hard drive and solid state drive) and network interface components such as a WLAN, WiFi or BlueTooth module. The component identifications 110 may include manufacturer identification codes, device identification, serial number, revision number, date codes or other identifying information for any of the components to be monitored.

Upon startup, the BIOS 106 can access the component identifications 110 in the SIO 104. The BIOS 106 may only do this when the SIO 104 has recorded an intrusion event. The BIOS 106 can the query the corresponding components (shown generally at 120) which will also have stored thereon their respective component identifications 110. In this way, the BIOS 106 can determined whether any component is now missing or has been replaced by a different, perhaps lesser, component.

The BIOS 106 will also have access to the user interface 122 of the computer being monitored. The BIOS 106 can use the user interface 122, for example, to display a report 124 indicating the existence and/or number of intrusions detected. The report 124 may also include a listing of any components that are now missing or replaced, as determined from the component identifications 110.

Alternatively, the BIOS 106 may transmit the report via other means to a user or administrator. For example, the BIOS 106 may send the report by email, instant message, Simple Message Service (SMS), voicemail, text or any other communication type.

Figure 5:
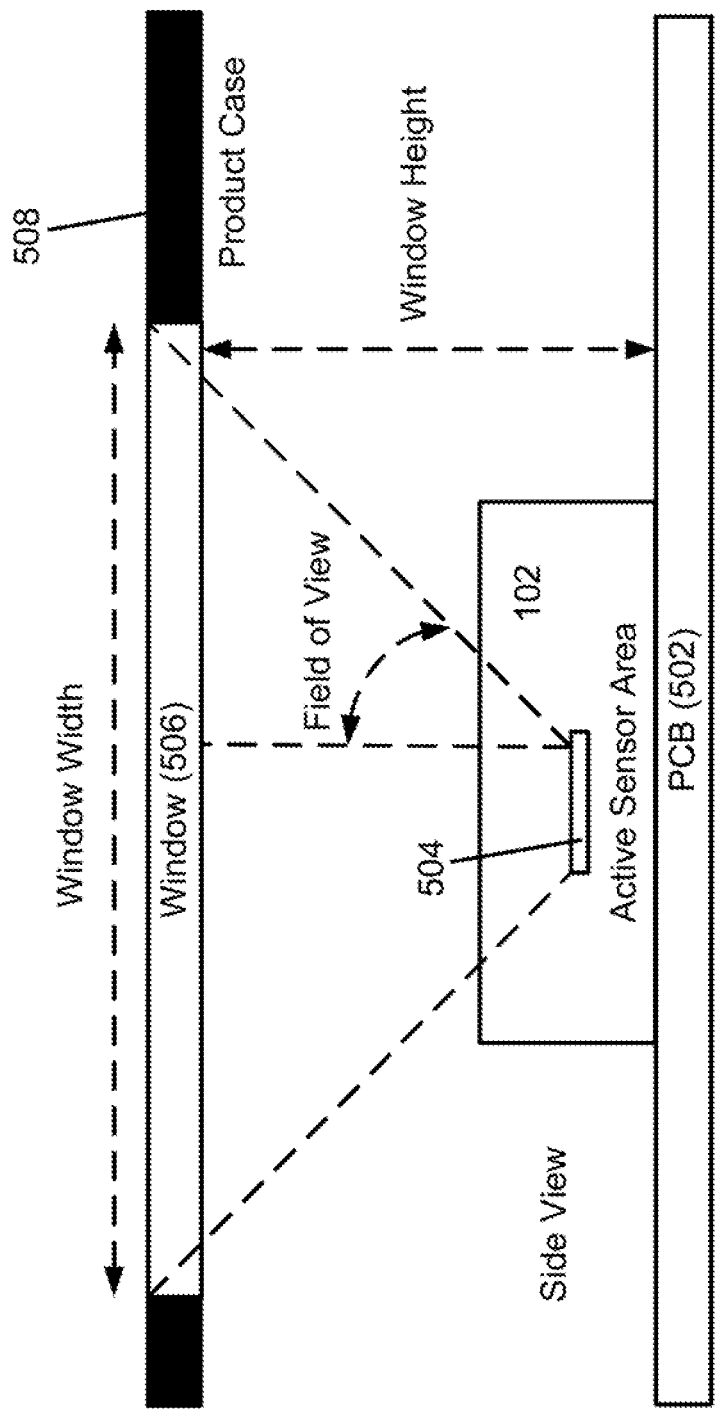
FIG. 5 is a diagram of an example ambient light sensor system for an intrusion detection system consistent with disclosed implementations.

FIG. 5 is a diagram of an example ambient light sensor system for an intrusion detection system consistent with disclosed implementations. As shown in FIG. 5, the ambient light sensor 102 is mounted on a printed circuit board (PCB) 502. Within the sensor 102 is the active sensor area 504. The active sensor area 504 will be connected, through the PCB 502 to the other components described above, for example, the amplifier and DAC shown in FIG. 2.

To avoid dust accumulating over the ambient light sensor 102 that may interfere with the calibration and light detection, the ambient light sensor 102 may be includes by a small protective cover 508 with a dark color glass window 506. The height of the optical window 506 from the ambient light sensor 102 determines the field of view of the sensor 102 and can be adjusted to meet any system requirements.

Figure 6:
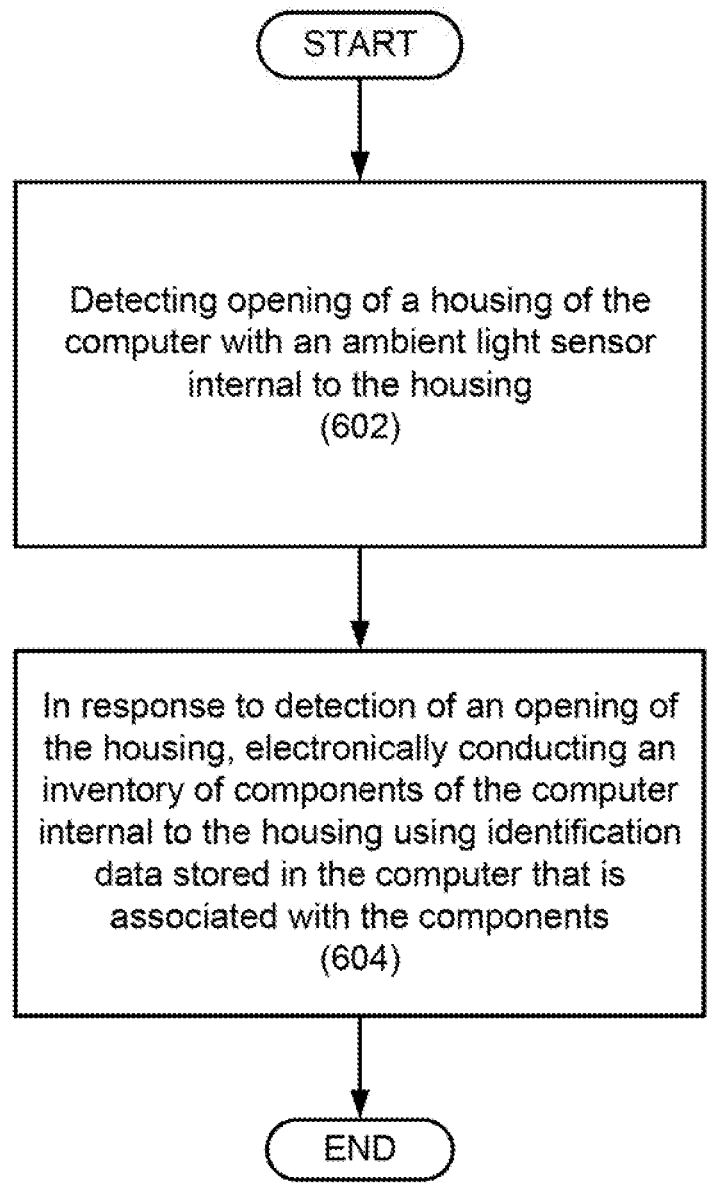
FIG. 6 is a flowchart of an example method for intrusion detection in a computer system consistent with disclosed implementations.

FIG. 6 is a flowchart of an example method for intrusion detection in a computer system consistent with disclosed implementations. As shown in FIG. 6, a method for intrusion detection in a computer includes: detecting 602 opening of a housing of the computer with an ambient light sensor internal to the housing; and, in response to detection of an opening of the housing, electronically conducting 604 an inventory of components of the computer internal to the housing using identification data for some of components of the computer that is stored in the computer.

Figure 7:
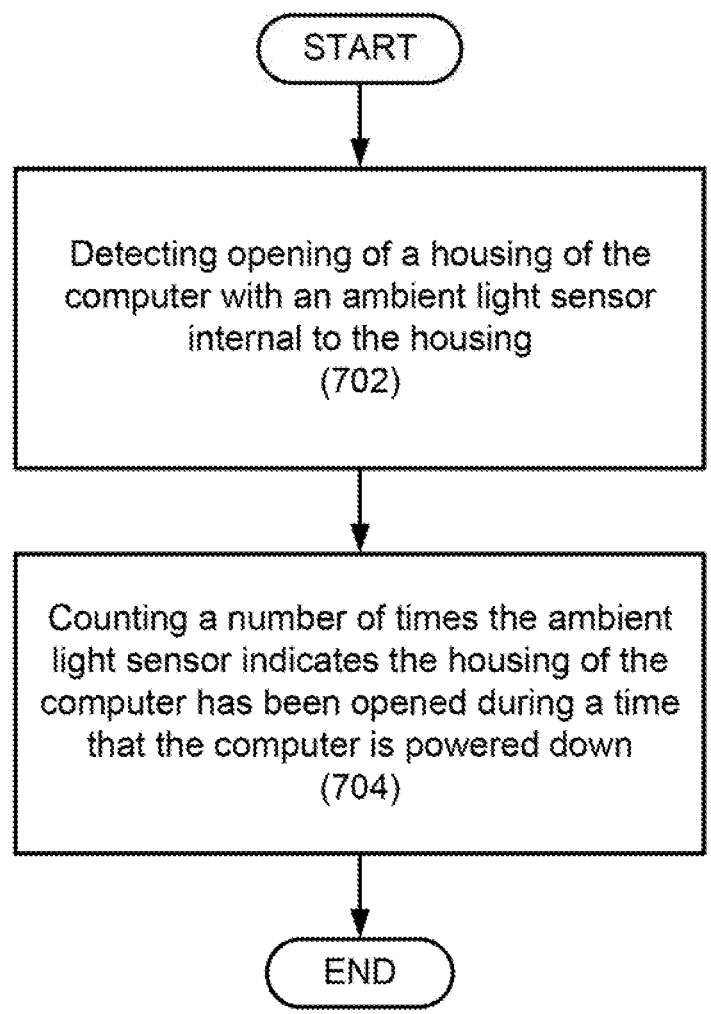
FIG. 7 is a flowchart of another example method for intrusion detection in a computer system consistent with disclosed implementations.

FIG. 7 is a flowchart of another example method for intrusion detection in a computer system consistent with disclosed implementations. As shown in FIG. 7, the method includes detecting 702 opening of a housing of the computer with an ambient light sensor internal to the housing, and counting 704 a number of times the ambient light sensor indicates the housing of the computer has been opened during a time that the computer is powered down.

Figure 8:
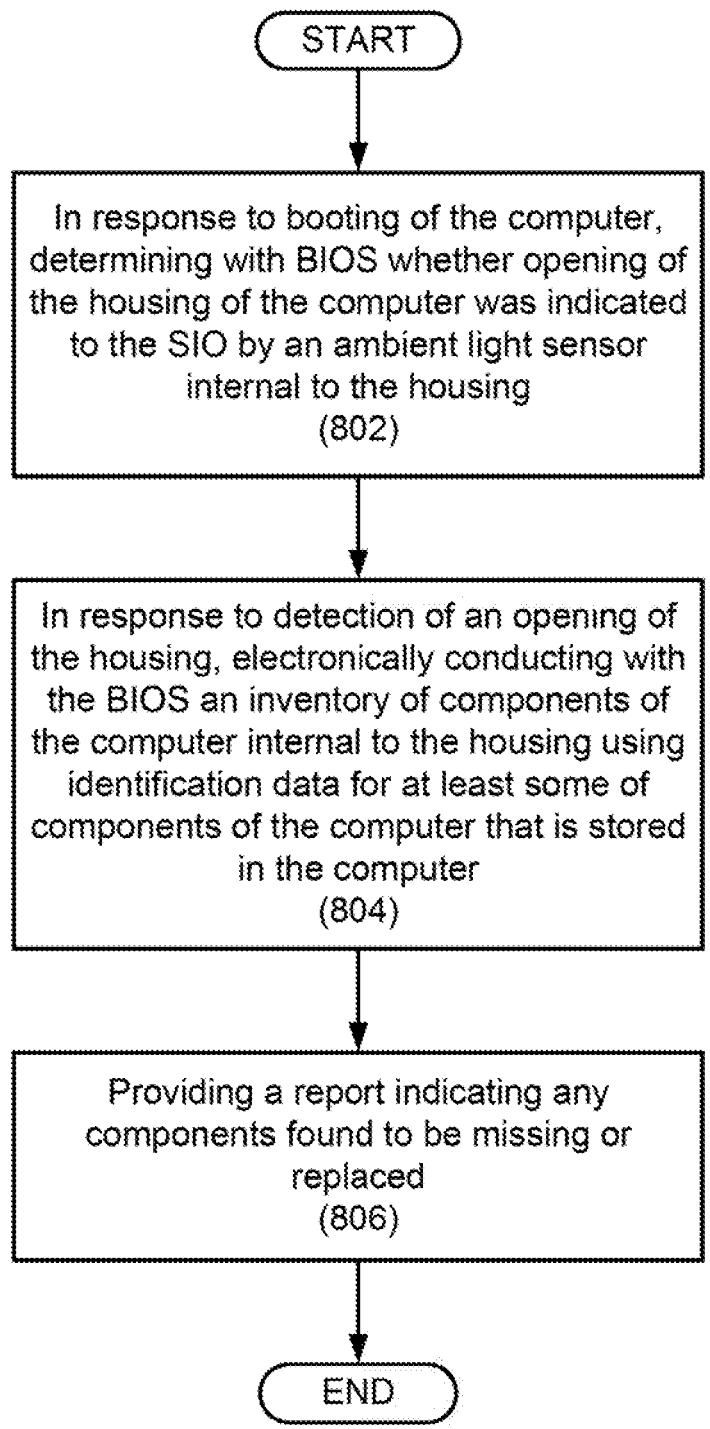
FIG. 8 is a flowchart of another example method for intrusion detection in a computer system consistent with disclosed implementations.

FIG. 8 is a flowchart of another example method for intrusion detection in a computer system consistent with disclosed implementations. As shown in FIG. 8, the method includes, in response to booting of the computer, determining 802 with BIOS whether opening of the housing of the computer was indicated to the SIO by an ambient light sensor internal to the housing; and, in response to detection of an opening of the housing, electronically conducting 804 with the BIOS an inventory of components of the computer internal to the housing using identification data for some of components of the computer that is stored in the computer. As described above, this may include providing a report indicating any components found to be missing or replaced.

The preceding description has been presented only to illustrate and describe examples of the principles described. This description is not intended to be exhaustive or to limit these principles to any precise form disclosed. Many modifications and variations are possible in light of the above teaching.

What is claimed is:

1. An intrusion detection system for a computer, the system comprising:
    an ambient light sensor to detect an increase in ambient light indicative of a housing of the computer being opened, the ambient light sensor tuned to a range of visible light corresponding to human vision;
    a super input/output integrated circuit (SIO) to receive a signal from the ambient light sensor indicating that the housing of the computer has been opened, wherein the SIO stores specific identification data for some components of the computer internal to the housing; and
    a Basic Input Output System (BIOS) in communication with the SIO, the BIOS to, in response to the SIO receiving the signal from the ambient light sensor indicating that the house of the computer has been opened, compare the stored specific identification data for a first component of the computer internal to the housing with current identification data from a corresponding component present in the computer internal to the housing to determine if the corresponding component is an illicit replacement for the first component.

2. The intrusion detection system of claim 1, wherein the SIO counts a multiple number of times the ambient light sensor indicates the housing of the computer has been opened during a time that the computer is powered down.

3. The intrusion detection system of claim 1, further comprising a Real Time Clock (RTC) power rail, the ambient light sensor being powered by the RTC power rail to remain active when the computer is powered down.

4. The intrusion detection system of claim 1, the BIOS to transmit a report of any components determined to be missing or replaced based on the identification data stored in the SIO.

5. The intrusion detection system of claim 1, further comprising a high-limit register and a low-limit register that together determine when the ambient light sensor signals the SIO that the housing of the computer has been opened.

6. The intrusion detection system of claim 1, wherein the identification data comprises at least one of a serial number or manufacturer identification code.

7. An intrusion detection system for a computer, the system comprising:
    an ambient light sensor to detect an increase in ambient light indicative of a housing of the computer being opened;
    a super input/output (I/O) integrated circuit to receive a signal from the ambient light sensor indicating that the housing of the computer has been opened, wherein the SIO stores unique identification data for some of the components of the computer; and
    a Basic Input Output System (BIOS) to communicate with the SIO when the computer is booted to determine whether the housing of the computer has been opened, the BIOS further to verify the presence of the components of the computer using the unique identification data stored in the SIO, in response to an indication that the housing of the computer was opened prior to the computer being booted.

8. The intrusion detection system of claim 7, the BIOS to transmit a report of any components determined to be missing or replaced based on the identification data stored in the SIO.

9. The intrusion detection system of claim 7, wherein the SIO counts a number of multiple times the ambient light sensor indicates the housing of the computer has been opened during a time that the computer is powered down.

10. A method for intrusion detection in a computer, the method comprising:

detecting opening of a housing of the computer with an ambient light sensor internal to the housing;

in response to detection of an opening of the housing, electronically conducting an inventory of components of the computer internal to the housing using identification data stored in the computer that is associated with the components; and determining that a corresponding component of the computer internal to the housing is an illicit replacement for a previously-present component by comparing the stored identification data for that component with current identification data provided by the corresponding component.

11. The method of claim 10, further comprising:

recording signals from the ambient light sensor indicative of an opening of the housing of the computer with a super Input/Output (I/O) integrated circuit; and with a Basic Input Output System (BIOS) of the computer, communicating with the SIO when the computer is booted to determine whether the housing of the computer has been opened;

wherein electronically conducting an inventory of components is performed by the BIOS in response to an indication that the housing of the computer was opened prior to the computer being booted.

12. The method of claim 11, further comprising transmitting a report of any components determined to be missing or replaced.

13. The method of claim 11, further comprising counting a number of multiple times the ambient light sensor indicates the housing of the computer has been opened during a time that the computer is powered down.

14. The intrusion detection system of claim 1, wherein the ambient light sensor comprises a filter to tune the ambient light sensor to the range of visible light corresponding to human vision.

15. The intrusion detection system of claim 1, wherein the ambient light sensor is a single chip lux meter with infra-red rejection tuned to the range of visible light corresponding to human vision.

16. The intrusion detection system of claim 1, further comprising a dark glass window over the intrusion detection system.

17. The intrusion detection system of claim 1, wherein the ambient light sensor has a measurement capability ranging from 0.01 lux to 83k lux.

18. The method of claim 7, wherein the BIOS only verifies the presence of the components of the computer using the identification data stored in the SIO when the ambient light sensor has detected opening of the computer housing during a period of time when the computer has been off prior to the BIOS being executed.

* * * * *